United States Patent
Miller et al.

(10) Patent No.: US 7,246,261 B2
(45) Date of Patent: Jul. 17, 2007

(54) JOIN PROTOCOL FOR A PRIMARY-BACKUP GROUP WITH BACKUP RESOURCES IN CLUSTERED COMPUTER SYSTEM

(75) Inventors: Robert Miller, Rochester, MN (US); Kiswanto Thayib, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 725 days.

(21) Appl. No.: 10/626,088

(22) Filed: Jul. 24, 2003

(65) Prior Publication Data
US 2005/0021574 A1 Jan. 27, 2005

(51) Int. Cl.
*G06F 11/00* (2006.01)
(52) U.S. Cl. .................. 714/7; 714/8; 714/14
(58) Field of Classification Search .......... 714/4, 714/6, 7
See application file for complete search history.

(56) References Cited

U.S. PATENT DOCUMENTS 6,594,786 B1    7/2003  Connelly et al.
2001/0056461 A1*  12/2001  Kampe et al. ............. 709/201
2003/0061132 A1    3/2003  Yu et al.
2003/0204539 A1   10/2003  Bergsten

OTHER PUBLICATIONS

Patent Application entitled "Primary-Backup Group With Backup Resources Failover Handler," filed on even date herewith by Michael J. McDermott et al.

* cited by examiner

*Primary Examiner*—Bryce Bonzo
(74) *Attorney, Agent, or Firm*—Wood, Herron & Evans, LLP

(57) ABSTRACT

Members of a primary-backup group in a clustered computer system are organized into subgroups to manage primary and backup resources being managed by the group. Group members are placed into subgroups based upon their access to particular resources, such that a primary subgroup may be defined comprised of members having access to a common primary resource, with one or more backup subgroups defined comprised of members having access to a common backup resource. A join protocol is used to determine to which of a plurality of resources managed by the primary-backup group a joining member has access, and to add the joining member to a subgroup for a resource to which the joining member has access.

38 Claims, 4 Drawing Sheets

JOIN PROTOCOL FOR A PRIMARY-BACKUP GROUP WITH BACKUP RESOURCES IN CLUSTERED COMPUTER SYSTEM

FIELD OF THE INVENTION

The invention is generally directed to clustered computer systems, and in particular, to the management of groups in clustered computer systems.

BACKGROUND OF THE INVENTION

"Clustering" generally refers to a computer system organization where multiple computers, or nodes, are networked together to cooperatively perform computer tasks. An important aspect of a computer cluster is that all of the nodes in the cluster present a single system image—that is, from the perspective of a user, the nodes in a cluster appear collectively as a single computer, or entity.

Clustering is often used in relatively large multi-user computer systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

Clusters typically handle computer tasks through the performance of "jobs" or "processes" within individual nodes. In some instances, jobs being performed by different nodes cooperate with one another to handle a computer task. Such cooperative jobs are typically capable of communicating with one another, and are typically managed in a cluster using a logical entity known as a "group." A group is typically assigned some form of identifier, and each job in the group is tagged with that identifier to indicate its membership in the group. Typically, these jobs, which are often referred to as "members", are resident on different nodes in a cluster.

Member jobs in a group typically communicate with one another using an ordered message-based scheme, where the specific ordering of messages sent between group members is maintained so that every member sees messages sent by other members in the same order as every other member, thus ensuring synchronization between nodes. Requests for operations to be performed by the members of a group are often referred to as "protocols," and it is typically through the use of one or more protocols that tasks are cooperatively performed by the members of a group.

Clusters often support changes in group membership through the use of group organizational operations such as membership change protocols, e.g., if a member job needs to be added to or removed from a group. One such change protocol is a join protocol, which is used to add a new member to a group. Among other operations, a join protocol ensures that group state or configuration information is sent to the joining member so that all members of the group have a consistent view of the state.

One type of group is a primary-backup group, in which one group member is designated as the primary, and the other group members are backups. Primary-backup groups are often used in a clustered computer system to manage a type of resource, such as a disk, tape or other storage unit, a printer or other imaging device, or another type of switchable hardware component or system.

One particular application of a primary-backup group is for managing switched disks. In such a group, the disk is accessible from either the primary or backup members, but only the primary member actually hosts the disk. Members join the group to provide additional backup members for the switched disk being managed by the group, with the typical join protocol transmitting configuration information for the disk from the primary member to the joining member, as the protocol assumes the joiner is able to access the disk.

In the event of a failure in a primary member in a clustered computer system, management of the resource is automatically switched over to a backup member, typically according to a predetermined backup order. Access to the resource is therefore maintained despite the failure of the primary member.

While the use of the aforementioned primary-backup groups increases the fault tolerance of a clustered computer system due to the ability to automatically switch management responsibility to different members of the group, such groups are not capable of directly addressing failures in the managed resources themselves. For example, failure of a disk can render the disk (and more importantly, the data on that disk) unavailable to the clustered computer system.

Resources such as disks and other storage systems often rely on other techniques for providing fault tolerance, such as mirroring, where data stored on one disk (typically referred to as a primary or production disk) is mirrored or copied to another disk (typically referred to as a backup or copy disk). With mirroring therefore, a failure in the primary disk in such a system typically does not cause a loss of stored data, as the backup disk typically may be accessed in the alternative to supply any requested data.

Should a mirrored resource such as a mirrored disk be utilized in a clustered computer system, it would be desirable to utilize a group structure similar to a conventional primary-backup group to manage the operation of such a resource, preferably in a manner that ensures fault tolerance both from the perspective of the group managing the resource and the underlying resource itself. In a conventional primary-backup group, where a single primary member hosts the primary resource, the use of a mirrored resource would require that the primary, as well as all backup members capable of assuming management duties, have access, and be capable of hosting, both the primary resource and any backup resources.

However, clustered computer systems are increasingly being implemented using more flexible and dispersed environments. For example, some clustered computer systems permit geographically distant computers to participate in the same cluster.

Indeed, from the perspective of fault tolerance of a resource, it is theoretically more reliable for primary and backup resources to reside in different cluster nodes, so that any failures in a particular cluster node only affects a subset of any resources resident in such nodes. Given, however, the possibility that a cluster may be dispersed among many different locations, a requirement that each member in a primary-backup group be capable of accessing and/or hosting both primary and backup resources would be overly constrictive, as oftentimes the management operations that may be performed by a member of a primary-backup group requires in the least proximity between the member and the resource being managed, if not direct connectivity therebetween.

As such, a need exists for a primary-backup group architecture that supports the hosting of primary and backup resources irrespective of the connectivity and dispersion of the group members in a clustered computer system. More specifically, a need exists for a join protocol that supports the creation of such a primary-backup group architecture.

SUMMARY OF THE INVENTION

The invention addresses these and other problems associated with the prior art in providing an apparatus, program product and method that organizes members of a primary-backup group into subgroups to manage primary and backup resources being managed by the group. In particular, group members are placed into subgroups based upon their access to particular resources, i.e., based upon their ability to host such resources. As such, a primary subgroup may be defined in a primary-backup group and comprised of members having access to a common primary resource, while one or more backup subgroups may be defined, with each comprising members having access to a common backup resource.

By organizing the members of a primary-backup group into subgroups capable of individually managing specific resources, fault tolerance and redundancy may be supported both from the standpoint of managing a particular resource (via the provision of multiple members that manage that resource), and from the standpoint of providing resource redundancy (via the provision of multiple subgroups that manage multiple resources). Put another way, should a particular member that manages a resource fail, another member of the same subgroup may be able to assume the management role of the failing member and provide continuing availability of the resource. Furthermore, should a particular resource, e.g., a primary resource fail, a backup resource, managed by another subgroup, may assume the role of the failing resource.

With such a primary-backup group configuration, a join protocol consistent with the invention may be configured to determine, during the joining of a joining member, to which of a plurality of resources, e.g., a primary resource and at least one backup resource, managed by a primary-backup group that joining member has access. Based upon such a determination, the joining member may then be added to a subgroup for a resource among the plurality of resources to which the joining member has access.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
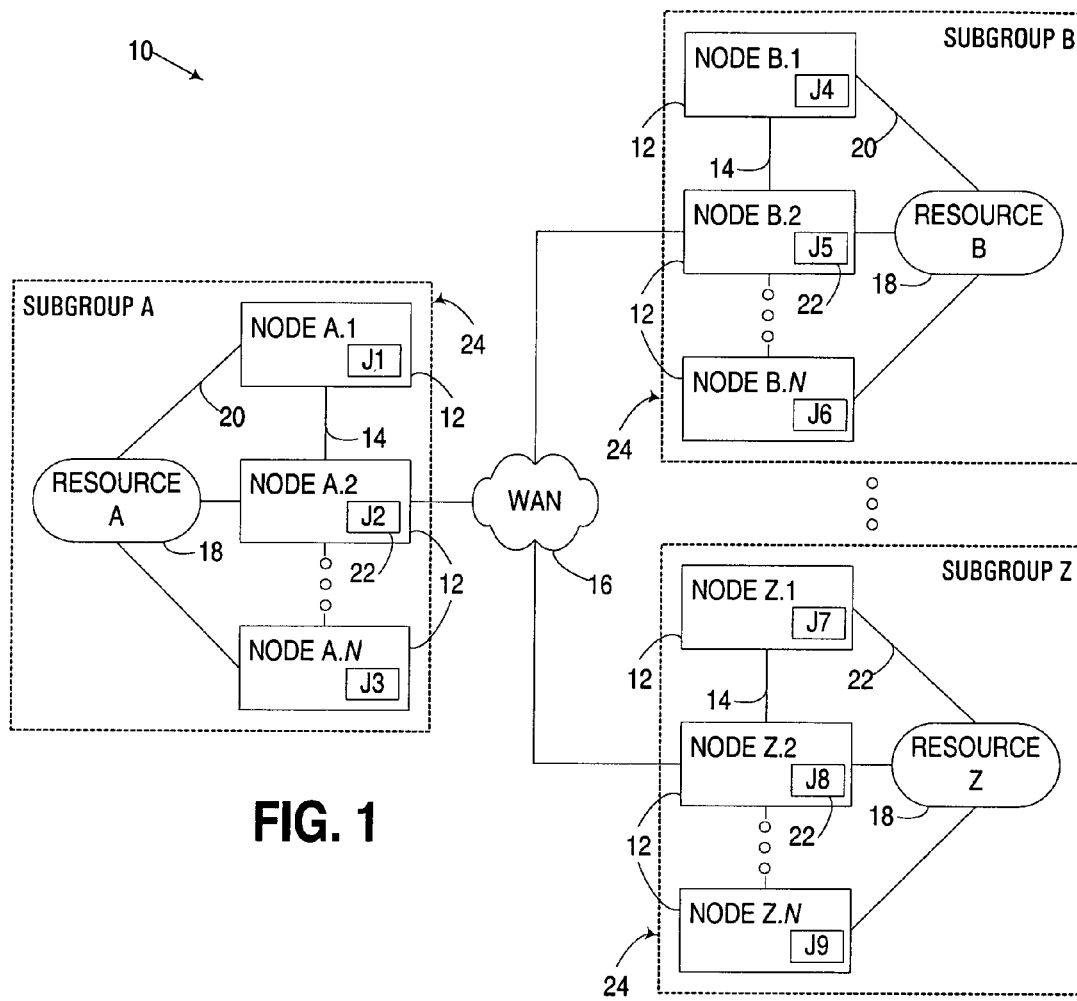
FIG. 1 is a block diagram of a clustered computer system consistent with the invention.

The embodiments described hereinafter facilitate the creation of primary-backup groups that are capable of managing both primary and backup resources in a clustered computer system.

As noted above, a particular application of primary-backup groups that is commonly used in clustered computer systems is to manage switched disks. Indeed, while the invention may be used in connection with other types of resources, e.g., printers and other imaging devices, tape drives and other storage devices, as well as other types of switchable hardware components, the embodiments discussed hereinafter will focus on disk-type (storage device) resources.

In a conventional primary-backup group, a disk being managed by the group is typically accessible from either the primary or backup members, but only the primary hosts the disk. Members join the group to provide additional backup members for the switched disk the group is managing. A typical join protocol sends the configuration information for the disk from the primary member to the joining member, since the protocol assumes that the joiner can access the disk.

However, this typical configuration does not provide fault tolerance if the disk fails. To overcome this, it may be desirable to "mirror" the disk, i.e., so that the data stored on the disk may be mirrored or copied to another disk. Thus, if the primary or "production" disk fails, then the backup or "copy" disk can become the new production disk.

In many environments, the copy disk need not be on the same node as the production disk, and for fault tolerance, it may be desirable for it not to be. Furthermore, in some environments, it may be desirable, or necessary, for the copy disk to be geographically remote from the production disk, e.g., coupled through a wide area network (WAN).

As will become more apparent below, a copy disk typically requires a host, because the host is typically used to manage the mirroring of data to the copy disk in a clustering environment.

It has been found that conventional join protocols are not adequate for primary-backup groups that manage both primary and backup resources such as production and copy disks. This is because conventional joins do not a production disk. Moreover, this problem is not unique to switched disks. Any primary-backup group that is managing backup resources that need to have consistent configuration or data may also have the problem. For example, say the primary-backup group is for a printer. Similar to the production and copy disk, there may be production and copy printers that need configuration information that is specific to the printer, e.g., level of Postscript, page orientation, or job control codes, and each copy printer requires a backup member to host the printer similar to the mirrored disk described above.

Embodiments consistent with the invention address these problems by utilizing "subgroups," which are subsets of group members that are all capable of accessing, and when called upon, hosting, a common (i.e., the same) resource.

Furthermore, a join algorithm utilized in these embodiments accounts for the joining of backup members, and if appropriate, the starting of mirroring. In these embodiments, each resource is associated with a subgroup, which is a subset of the group members that have access to and that can host the resource. In addition, in some embodiments a backup order may be specified for the group, or optionally, for each individual subgroup.

Turning to the Drawings, wherein like numbers denote like parts throughout the several views, FIG. 1 illustrates an exemplary clustered computer system 10 including a plurality of nodes 12 interconnected with one another in a distributed manner, e.g., via local area networks (LAN's) or high speed interconnects 14 and a wide area network (WAN) 16. Any number of network topologies commonly utilized in clustered computer systems may be used consistent with the invention. Moreover, individual nodes 10 may be physically located in close proximity with other nodes, or may be geographically separated from other nodes, as is well known in the art. Moreover, wide variety of interconnection types, network types, node types, etc., may be permitted to coexist with one another in an efficient and reliable manner in clustered computer system 10.

Also coupled to clustered computer system 10 is a plurality of resources 18 capable of being organized into primary and backup resources, and furthermore, capable of being managed by a primary-backup group consistent with the invention. It will be appreciated that different resources may be distributed throughout a clustered computer system, and that certain nodes 12 may or may not have the ability to host particular resources. Precisely which nodes are capable of hosting a resource may vary in different embodiments. For example, a node may be permitted to host a resource only when that resource actually resides in the node, e.g., by being mounted within the node itself, when that resource is coupled to the node by a high speed interconnect, or otherwise when the resource is accessible to the node.

Nodes 12 that are capable of hosting a resource 18 are illustrated in FIG. 1 by virtue of interconnects 20. In addition, by being capable of hosting a resource, a node is also considered herein to have "access" to that resource. In this regard, the nodes 12 that are capable of hosting resource A are designated herein as nodes A.1, A.2, . . . A.N. Likewise, the nodes 12 that are capable of hosting resources B . . . Z are designated herein as nodes B.1, B.2, . . . B.Z, . . . Z.1, Z.2, . . . Z.N.

Consistent with the invention, a primary-backup group for managing resources A, B, . . . Z is formed using member jobs 22 resident on nodes 12 by partitioning the member jobs into subgroups 24 based upon which resources are capable of being hosted by the underlying nodes upon which such member jobs reside. As shown in FIG. 1, for example, nine members jobs J1-J9 are illustrated, with jobs J1-J3 resident on nodes A.1, A.2 and A.N, jobs J4-J6 resident on nodes B.1, B.2 and B.N, and jobs J7-J9 resident on nodes Z.1, Z.2 and Z.N. Given the accessibility of nodes A.1, A.2, . . . A.N to resource A, jobs J1-J3 are therefore defined within a subgroup A. Likewise, given the accessibility of nodes B.1, B.2, . . . B.N to resource B, and nodes Z.1, Z.2, . . . Z.N to resource Z, jobs J4-J6 are defined within a subgroup B and jobs J7-J9 are defined within a subgroup C.

It will be appreciated that the number of resources, nodes and jobs, and the particular networking architecture illustrated in FIG. 1, are all merely exemplary in nature. Practically any number of resources, nodes, jobs and networking architectures may be used in a clustered computer system consistent with the invention.

Figure 2:
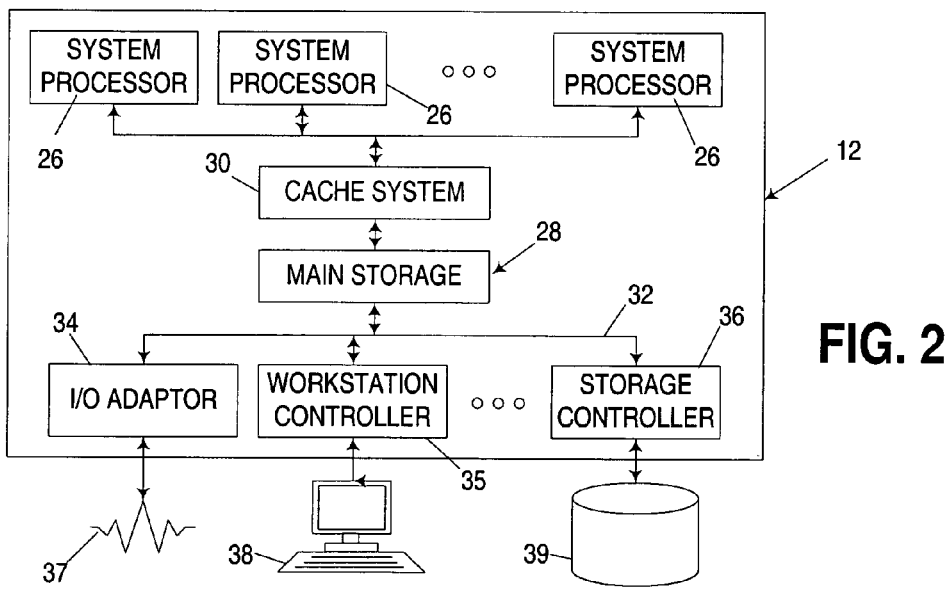
FIG. 2 is a block diagram of a node in the clustered computer system of FIG. 1.

Now turning to FIG. 2, an exemplary hardware configuration for one of the nodes 12 in clustered computer system 10 is shown. Node 12 generically represents, for example, any of a number of multi-user computers such as a network server, a midrange computer, a mainframe computer, etc. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like).

Node 12 generally includes one or more system processors 26 coupled to a main storage 28 through one or more levels of cache memory disposed within a cache system 30. Furthermore, main storage 28 is coupled to a number of types of external devices via a system input/output (I/O) bus 32 and a plurality of interface devices, e.g., an input/output adaptor 34, a workstation controller 35 and a storage controller 36, which respectively provide external access to one or more external networks 37, one or more workstations 38, and/or one or more storage devices such as a direct access storage device (DASD) 39. Any number of alternate computer architectures may be used in the alternative.

Figure 3:
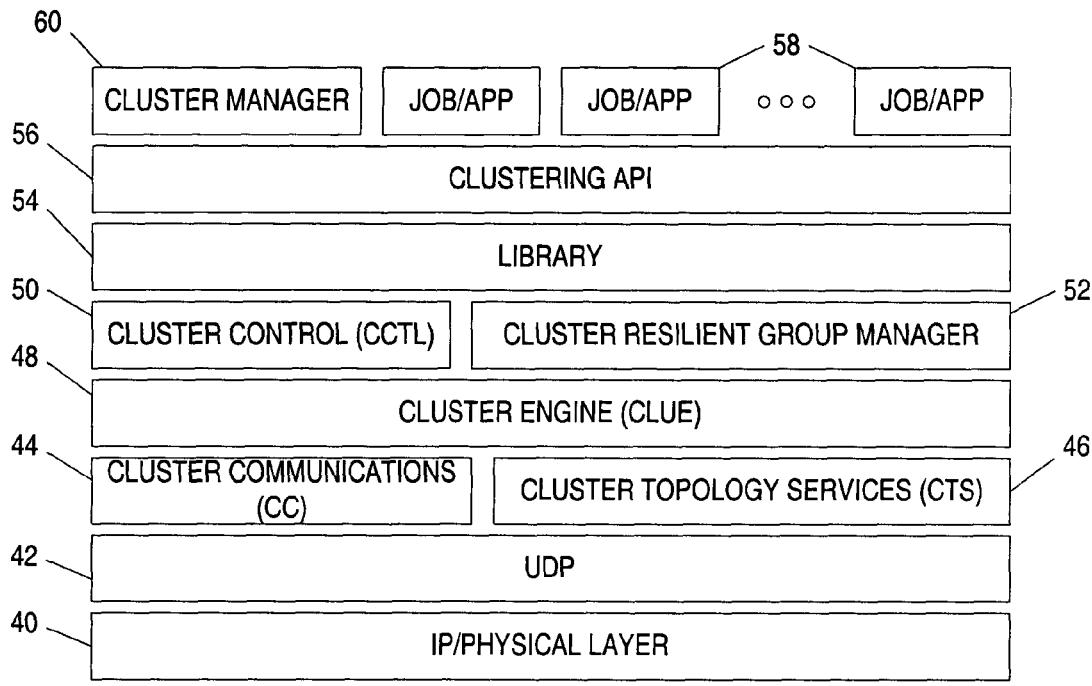
FIG. 3 is a software layer diagram of the principal clustering software components utilized in the node of FIG. 2.

As shown in FIG. 3, the principal software components executed within each node 12 include an IP/physical layer component 40, a UDP component 42, a cluster communications (CC) component 44, a cluster topology services (CTS) component 46, a cluster engine (CLUE) component 48, a cluster control (CCTL) component 50, a cluster resilient group manager component 52, a library component 54, a clustering API component 56, and a plurality of jobs/applications 58, including a cluster manager application 60.

Generally, IP/physical layer component 40 provides an industry standard communications stack and physical interface with a network. UDP component 42 provides a packet transmission protocol, and CC component 44 provides support for reliable multicast clustering communication services.

CTS component 46 monitors the network topology of a clustered computer system, and stores information such as the layout of nodes, the specifications of network interconnects between nodes, the geographical locations of nodes, and node status information. CLUE component 48 provides a distributed ordered group messaging service. CCTL component 50 manages the configuration and activation of clustering on a node, typically supporting various cluster initialization and node management operations suitable for managing a clustered environment.

Cluster resilient group manager component 52 synchronously maintains copies of group membership status information across the cluster. Furthermore, it is principally within component 52 that a primary-backup group join algorithm consistent with the invention may be implemented.

Library component 54 provides other support services for a cluster. Clustering API component 56 provides the external interface to the underlying clustering functionality via jobs/applications 58. Cluster manager application 60 that provides the user interface whereby a user such as a systems administrator can manage clustering operations in the system.

The discussion hereinafter will focus on the specific routines utilized to implement the above-described join protocol functionality. The routines executed to implement the embodiments of the invention, whether implemented as part of an operating system or a specific application, component, program, object, module or sequence of instructions, will also be referred to herein as "computer program code," or simply "program code." The computer program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

Figure 4A:
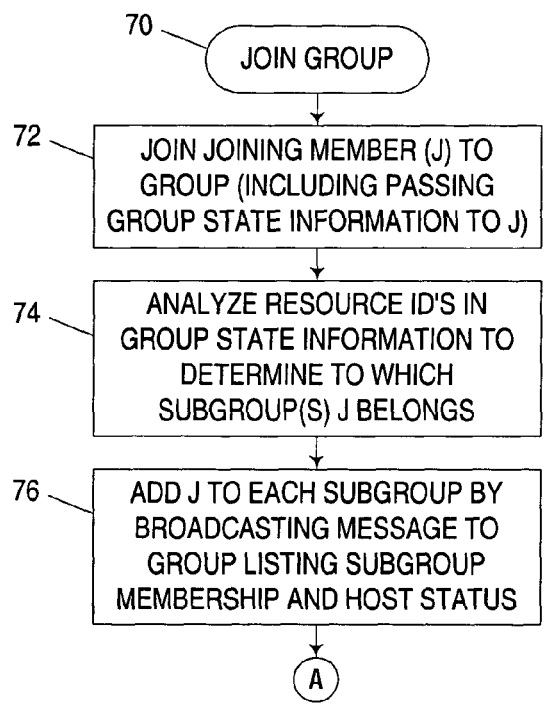
FIGS. 4A and 4B are flowcharts illustrating the program flow of a join group routine used to join a member to a primary-backup group in a manner consistent with the invention in the clustered computer system of FIG. 1.
Figure 4B:
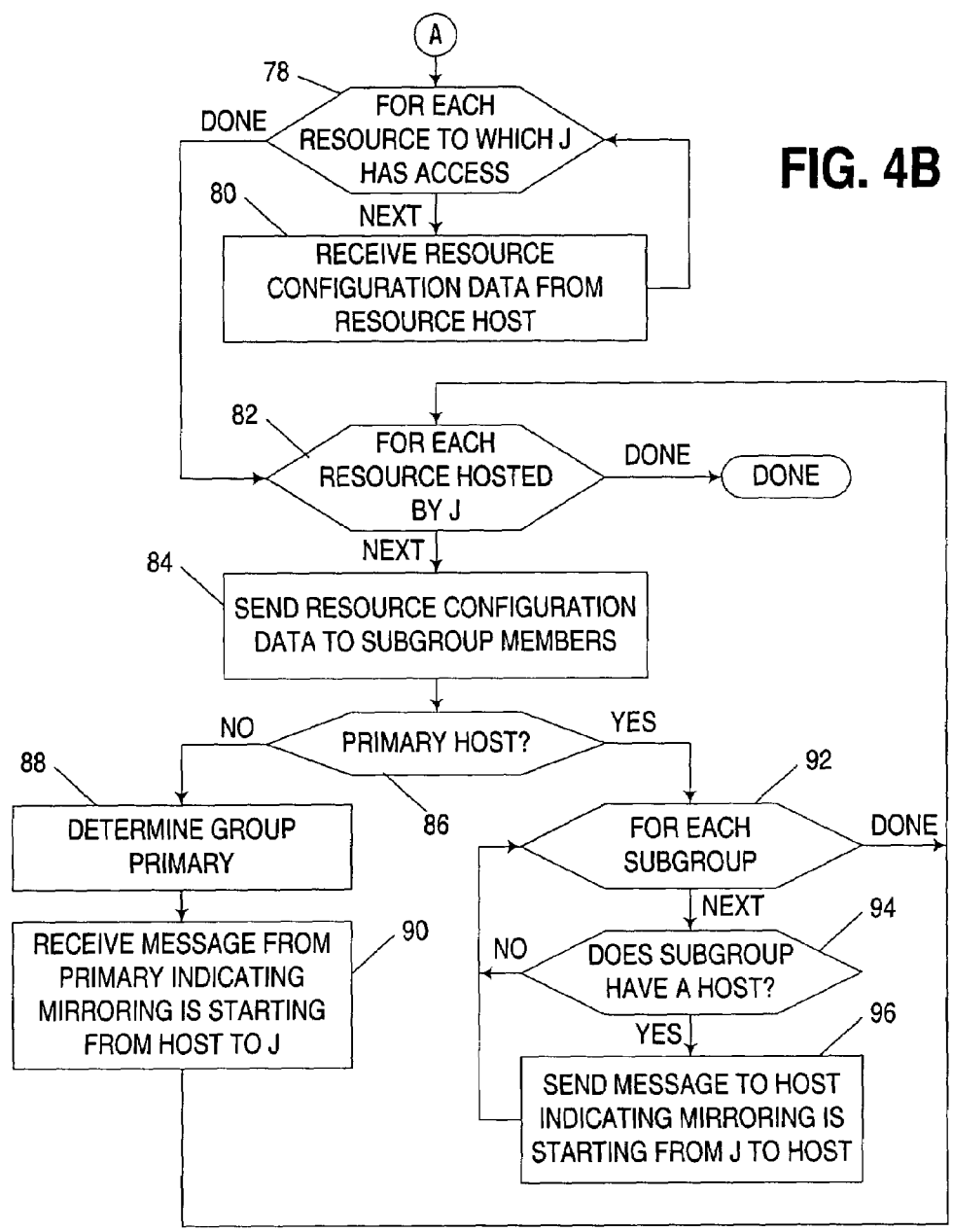

Now turning to FIGS. 4A-4B, a join protocol for organizing a plurality of members into a primary-backup group consistent with the invention is shown. This protocol or algorithm assumes that there is persistent group state information replicated by each member that has a list of the resources that are to be managed by the group. The list is of resource identifiers, one identifier per resource, and not necessarily the resource configuration. The protocol also assumes that there are methods that a member can invoke to determine if the resource identified by a resource identifier is accessible by the member or if the member has ownership of the resource. The protocol furthermore assumes that a group member has access or ownership to at least one resource, and that a resource always has one owner or host at a time. Furthermore, this routine presumes that the resources are of the type that may be mirrored, e.g., disks or other storage devices.

In particular, FIGS. 4A-4B illustrate a join group routine 70 executed on a node of a clustered computer system by a joining member resident on that node. It will be appreciated that, as with most cluster or group protocols, underlying functionality in each node of a cluster cooperatively handles messaging and other lower level aspects of the join protocol to supplement the functions performed in routine 70.

Routine 70 begins in block 72 by joining the joining member (J) to the group, e.g., by initiating a join protocol in the group mechanism in the clustering environment. As a component of joining the group, the group mechanism broadcasts a join membership change message to all existing group members (including J). If J is the first member of the group, then J uses its copy of the group state information. Otherwise, if J is not the first member of the group, typically another member is selected to send J its copy of the group state information. The member can be selected in various ways, such as the primary, lowest numbered backup, etc. Since the group state is replicated, it makes no difference which member sends the information.

Next, as shown in block 74, J determines, using the group state information, to which subgroups it belongs. In particular, the group state information includes a list of resource identifiers, and as such, J iterates through the resource identifiers to determine which resources J owns or has access to.

Next, as shown in block 76, J adds itself to each subgroup associated with a resource that J has access to or ownership of. If J owns a resource, J becomes the host for that resource. J then sends a group message indicting which subgroups it is in, and if it is hosting any resources. The group state information is thereafter updated appropriately on all group members.

Next, as shown in block 78, a loop is initiated to iterate for each resource to which J has access (but which J does not currently host or own). For each such resource, and as shown in block 80, J uses the group state to determine if the resource has a host. Only the members in the resource subgroup are examined. If there is a host, then the host will send a message to J with the resource configuration. As such, in block 80, J receives resource configuration data from the resource host.

Next, as shown in block 82, a loop is initiated to process each resource hosted by J. For each such resource, J uses the subgroup to send a configuration message to all subgroup members, including the resource configuration data for the resource (e.g., for a storage device, data such as the number of disk units, the unit addresses, the types of disk units, etc.), as shown in block 84.

Next, block 86 determines if J is the host of the primary resource. If not, block 86 passes control to block 88 to determine, based upon the backup order specified for the group, which member is the group primary (i.e., the host of the primary resource). If the group primary member has joined the group and is hosting the primary resource, then the group primary starts mirroring to J. As a component of the initiation of mirroring, the group primary member sends a message to J as a backup resource host, indicating that mirroring is starting from the group primary to J. Control then returns to block 82 to process additional resources hosted by J (if any). Once all such resources have been processed, routine 70 is complete.

Returning to block 86, if J is the host of the primary resource (i.e., is the group primary member), block 86 passes control to block 92 to initiate a loop to send messages to each backup subgroup. For each such subgroup, block 92 passes control to block 94 to determine first whether the subgroup currently has a host. If so, control passes to block 96 to send a message to that host indicting that mirroring is starting from J to the host. Control then returns to block 92 to process additional subgroups. Also, returning to block 94, if no host is currently joined for a subgroup, block 96 is bypassed, and control returns directly to block 92. In addition, once all subgroups have been processed, block 92 passes control to block 82 to process any additional resources hosted by J.

Mirroring between primary and backup resources generally occurs in much the same manner as is known in the art. For example, for mirroring between resources implemented as production and copy disks, mirroring occurs by establishing, with the production host, a communication channel with each copy host, based upon the known addresses of the production and copy hosts. Then, as pages of data are written out from memory to the production disk, the same data is also transmitted to the copy disks to effectively mirror the production disk.

It will be appreciated that mirroring may not be required for some types of resources, e.g., imaging devices and the like. As such, the steps in routine 70 that are involved in notifying subgroups of the initiation of mirroring may be omitted in some embodiments.

Figure 5:
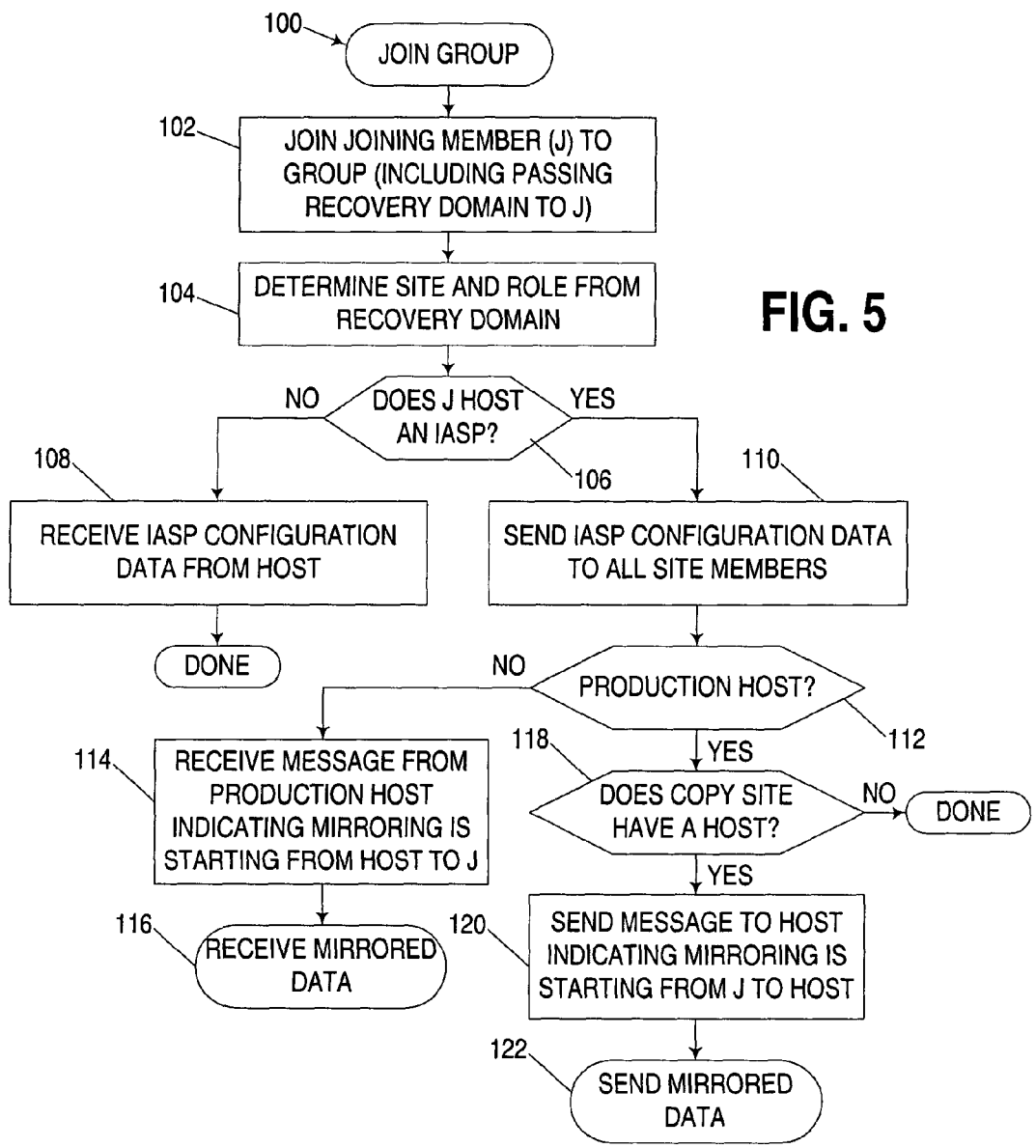
FIG. 5 is a flowchart illustrating the program flow of an alternate join group routine to that shown in FIGS. 4A and 4B.

FIG. 5 next illustrates another embodiment of a join algorithm specifically suited for use in clustered eServer iSeries servers from International Business Machines Corporation. This algorithm may be used, for example, to provide support for Cross Site Mirroring, where production and copy disks are hosted at remote geographical locations from one another, or in other applications where no primary interconnect exists between production and copy disks. In this implementation, the primary-backup group is referred to as a device cluster resource group (CRG). A CRG has a recovery domain, which is the group state information, and which is replicated to all CRG members. The recovery domain has a list of all the members of the CRG, along with the backup order. A subgroup is named a site, and a CRG supports two sites, "production" and "copy." The primary disk is called a "production copy" on Independent Auxiliary Storage Pool (IASP), and the backup disk is called the "mirror copy" or "copy".

For this implementation, it is assumed that a member is associated with exactly one site, the group primary hosts the production copy, and the lowest numbered backup at the copy site hosts the mirror copy.

When a device CRG is created, a user will typically enter the site and the associated members for that site, the backup order, and which member should be the primary. The member that hosts the disk at the copy site is the lowest numbered backup at the site.

As shown in FIG. 5, a join group routine 100 may be executed on a node to join a member to a primary-backup group under the scenario described above. Routine 100 begins in block 102 by joining a joining member (J) to the group. As above, this results in the group mechanism broadcasting a message to all group members (including J). If J is the first member of the group, then J uses its copy of the group state information, otherwise, the primary member of the group sends its copy of the group state information to J.

Next, as shown in block 104, J determines its site and role from the recovery domain. The role is whether J should host the IASP at the site or have access to it.

Next, block 106 determines whether J should host the IASP. If J has access to an IASP, and thus is not the primary or copy site host, control passes to block 108 to receive IASP configuration data from the host for the IASP for the site to which J belongs, if such a host exists. Routine 100 is then complete.

Otherwise, if J does host the IASP, control passes from block 106 to block 110, where J sends a configuration message to all site members, including configuration data for the site IASP.

Next, block 112 determines whether J is the production host, i.e., whether J hosts the IASP at the primary site. If not, control passes to block 114 to receive a message from the primary host indicating that mirroring is starting from the primary host to J, if the primary host has joined the group and is currently hosting the production copy. Mirroring then starts to J, whereby control then passes to block 116 to terminate and begin receiving mirrored data from the host at J.

Returning to block 112, if J is the primary host, control passes to block 118 to determine whether the copy site currently has a host. If not, routine 100 terminates. If so, however, control passes to block 120 to send a message to the host of the copy site indicating that mirroring is starting from J to the copy site host. Control then passes to block 122 to terminate routine 100 and initiate the sending of mirrored data to the copy site host.

It will be appreciated that, should the copy site host later join the group, mirroring will be initiated at that later time. Thus, in general once a host for each of the production and copy sites has joined the group, mirroring will be initiated between the production and copy disks.

Once mirroring is established additional functionality may also be supported to handle functions such as failover of a host or failover of a resource. For example, one exemplary implementation of functionality for handling failover of a member of a primary-backup group as described herein is described in U.S. Ser. No. 10/626,087, filed on even date herewith by Michael J. McDermott et al., and entitled "PRIMARY-BACKUP GROUP WITH BACKUP RESOURCES FAILOVER HANDLER," which is assigned to the same assignee as the present application, and which is incorporated by reference herein.

Various additional modifications may be made to the herein-described embodiments without departing from the spirit and scope of the invention. Therefore, the invention lies in the claims hereinafter appended.

What is claimed is:

1. A method of organizing a plurality of members in a primary-backup group in a clustered computer system, the method comprising:
   forming a primary subgroup including at least one member from the plurality of members, wherein each member in the primary subgroup has access to a common primary resource; and
   forming a backup subgroup including at least one member from the plurality of members, wherein each member in the backup subgroup has access to a common backup resource.

2. The method of claim 1, further comprising communicating group state information between the plurality of members, the group state information identifying the resources managed by the primary-backup group.

3. The method of claim 1, further comprising selecting a primary host member for the primary resource from the primary subgroup, and selecting a backup host member for the backup resource from the backup subgroup.

4. The method of claim 3, further comprising communicating group state information that identifies the primary and backup host members between the plurality of members.

5. The method of claim 3, further comprising communicating resource configuration data for the primary resource from the primary host member to any other member of the primary subgroup, and communicating resource configuration data for the backup resource from the backup host member to any other member of the backup subgroup.

6. The method of claim 3, wherein the primary and backup resources each comprise a storage device, the method further comprising, sending a message from the primary host member to the backup host member in connection with initiating mirroring from the primary host member to the backup host member.

7. The method of claim 1, further comprising forming a second backup subgroup including at least one member from the plurality of members, wherein each member in the second backup subgroup has access to a common second backup resource.

8. The method of claim 1, wherein each of the primary and backup resources is selected from the group consisting of storage devices and imaging devices.

9. A method of joining a member to a primary-backup group in a clustered computer system, the method comprising:
   determining to which of a plurality of resources managed by the primary-backup group the joining member has access, the plurality of resources including a primary resource and at least one backup resource; and
   adding the joining member to a subgroup for a resource among the plurality of resources to which the joining member has access, wherein the subgroup is among a plurality of subgroups defined in the primary-backup group, wherein each subgroup is associated with a resource among the plurality of resources, and wherein each member of each subgroup has access to the resource with which such subgroup is associated.

10. The method of claim 9, wherein determining to which of the plurality of resources the joining member has access includes determining to which of the plurality of resources the joining member is capable of hosting.

11. The method of claim 9, wherein determining to which of the plurality of resources the joining member has access includes accessing group state information.

12. The method of claim 9, wherein adding the joining member to the subgroup includes sending a message to the primary-backup group identifying the subgroup to which the joining member has been added, and whether the joining member is hosting the resource associated with the subgroup.

13. The method of claim 9, further comprising, if the joining member is not hosting the resource associated with the subgroup, receiving resource configuration data from another member of the subgroup that is hosting the resource.

14. The method of claim 9, further comprising, if the joining member is hosting the resource associated with the subgroup, sending resource configuration data to each other member of the subgroup.

15. The method of claim 9, wherein each of the plurality of resources comprises a storage device, the method further comprising, if the joining member is hosting the resource associated with the subgroup, determining whether the resource is the primary resource.

16. The method of claim 15, further comprising, if the resource associated with the subgroup to which the joining member is added is determined to not be the primary resource, receiving a message from another member that is hosting the primary resource indicating that mirroring is being initiated from the other member to the joining member.

17. The method of claim 15, further comprising, if the resource associated with the subgroup to which the joining member is added is determined to be the primary resource, sending a message from the joining member to another member that is hosting a backup resource indicating that mirroring is being initiated from the joining member to the other member.

18. The method of claim 9, wherein each of the plurality of resources comprises a storage device, the method further comprising, if the joining member is hosting the resource associated with the subgroup, synchronizing with at least one other member hosting another resource among the plurality of resources to initiate mirroring from the primary resource to the backup resource.

19. The method of claim 9, further comprising adding the joining member to a second subgroup for a second resource among the plurality of resources to which the joining member has access.

20. The method of claim 9, wherein the plurality of resources are selected from the group consisting of storage devices and imaging devices.

21. A clustered computer system, comprising:
   primary and backup resources;
   a plurality of nodes coupled to one another over a network, at least one node having access to the primary resource, and at least one node having access to the backup resource; and
   program code resident on the plurality of nodes and configured to organize a plurality of members resident on the plurality of nodes into a primary-backup group, the program code configured to organize the plurality of members by forming a primary subgroup including at least one member from the plurality of members and a backup subgroup including at least one member from the plurality of members, wherein each member in the primary subgroup has access to the primary resource, and each member in the backup subgroup has access to the backup resource.

22. The clustered computer system of claim 21, wherein the program code is further configured to select a primary host member for the primary resource from the primary subgroup, and select a backup host member for the backup resource from the backup subgroup.

23. The clustered computer system of claim 22, wherein the program code is further configured to communicate resource configuration data for the primary resource from the primary host member to any other member of the primary subgroup, and communicate resource configuration data for the backup resource from the backup host member to any other member of the backup subgroup.

24. The clustered computer system of claim 23, wherein the primary and backup resources each comprise a storage device, and wherein the program code is configured to send a message from the primary host member to the backup host member in connection with initiating mirroring from the primary host member to the backup host member.

25. The clustered computer system of claim 21, further comprising a second backup resource, wherein the program code is configured to form a second backup subgroup including at least one member from the plurality of members, wherein each member in the second backup subgroup has access to the second backup resource.

26. The clustered computer system of claim 21, wherein each of the primary and backup resources is selected from the group consisting of storage devices and imaging devices.

27. An apparatus, comprising:

a memory;

at least one processor; and program code resident in the memory and configured for execution on the at least one processor, the program code configured to join a member to a primary-backup group in a clustered computer system by determining to which of a plurality of resources managed by the primary-backup group the joining member has access, and adding the joining member to a subgroup for a resource among the plurality of resources to which the joining member has access, wherein the plurality of resources includes a primary resource and at least one backup resource, wherein the subgroup is among a plurality of subgroups defined in the primary-backup group, wherein each subgroup is associated with a resource among the plurality of resources, and wherein each member of each subgroup has access to the resource with which such subgroup is associated.

28. The apparatus of claim 27, wherein the program code is configured to determine to which of the plurality of resources the joining member has access by determining to which of the plurality of resources the joining member is capable of hosting.

29. The apparatus of claim 27, wherein the program code is configured to add the joining member to the subgroup by sending a message to the primary-backup group identifying the subgroup to which the joining member has been added, and whether the joining member is hosting the resource associated with the subgroup.

30. The apparatus of claim 27, wherein the program code is further configured to send resource configuration data to each other member of the subgroup if the joining member is hosting the resource associated with the subgroup.

31. The apparatus of claim 27, wherein each of the plurality of resources comprises a storage device, and wherein the program code is further configured to determine whether the resource is the primary resource if the joining member is hosting the resource associated with the subgroup.

32. The apparatus of claim 31, wherein the program code is further configured to, if the resource associated with the subgroup to which the joining member is added is determined to not be the primary resource, receive a message from another member that is hosting the primary resource indicating that mirroring is being initiated from the other member to the joining member.

33. The apparatus of claim 31, wherein the program code is further configured to, if the resource associated with the subgroup to which the joining member is added is determined to be the primary resource, send a message from the joining member to another member that is hosting a backup resource indicating that mirroring is being initiated from the joining member to the other member.

34. The apparatus of claim 27, wherein each of the plurality of resources comprises a storage device, wherein the program code is further configured to, if the joining member is hosting the resource associated with the subgroup, synchronize with at least one other member hosting another resource among the plurality of resources to initiate mirroring from the primary resource to the backup resource.

35. The apparatus of claim 27, wherein the program code is further configured to add the joining member to a second subgroup for a second resource among the plurality of resources to which the joining member has access.

36. The apparatus of claim 27, wherein the plurality of resources are selected from the group consisting of storage devices and imaging devices.

37. A program product, comprising:

program code configured to join a member to a primary-backup group in a clustered computer system by determining to which of a plurality of resources managed by the primary-backup group the joining member has access, and adding the joining member to a subgroup for a resource among the plurality of resources to which the joining member has access, wherein the plurality of resources includes a primary resource and at least one backup resource, wherein the subgroup is among a plurality of subgroups defined in the primary-backup group, wherein each subgroup is associated with a resource among the plurality of resources, and wherein each member of each subgroup has access to the resource with which such subgroup is associated; and a physical computer readable storage medium bearing the program code.

38. The program product of claim 37, wherein the physical computer readable storage medium includes a recordable medium.

* * * * *